March 17, 1970 JAMES E. WEBB 3,501,648
ADMINISTRATOR OF THE NATIONAL AERONAUTICS AND SPACE ADMINISTRATION
SWITCHING CIRCUIT
Filed June 29, 1966
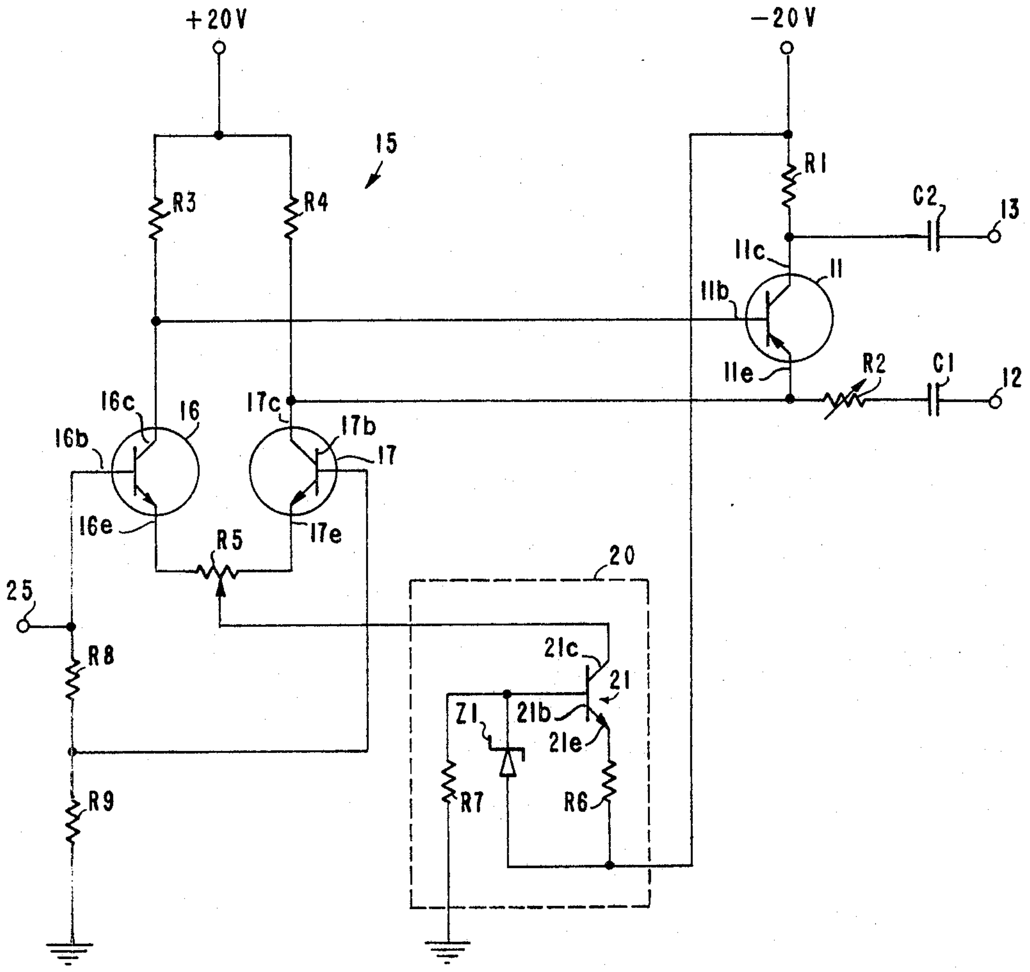
INVENTORS
CARL P. CHAPMAN
DONALD R. RUPNIK
BY
ATTORNEYS

United States Patent Office 3,501,648
Patented Mar. 17, 1970

3,501,648

SWITCHING CIRCUIT

James E. Webb, Administrator of the National Aeronautics and Space Administration, with respect to an invention of Carl P. Chapman, La Crescenta, Calif., and Donald R. Rupnik, Sunland, Calif.

Filed June 29, 1966, Ser. No. 562,933
Int. Cl. H03k *17/00*
U.S. Cl. 307—254 4 Claims

ABSTRACT OF THE DISCLOSURE

A solid state switching circuit is disclosed in which AC signals at an input terminal are switched to an output terminal through a gating transistor, as a function of the transistor's state of conduction. The state of conduction is controlled by controlling the DC potential difference between its emitter and base and by means of a pair of control transistors, forming part of a DC control circuit. The relative states of conduction of the control transistors which produce the potential difference are controlled as a function of the amplitude of a DC control signal.

The invention described herein was made in the performance of work under a NASA contract and is subject to the provisions of Section 305 of the National Aeronautics and Space Act of 1958, Public Law 85-568 (72 Stat. 435; 42 USC 2457).

This invention relates to switching circuitry and, more particularly, to a solid state circuit for switching AC (alternating current) signals between input and output terminals as a function of DC (direct current) controlling signals.

Generally, herebefore, DC control signals or voltages have been used to control or switch DC voltages to an appropriate DC load. It is a primary object of the present invention therefore to provide a novel circuit in which DC control voltages are used to control the switching of AC signals.

Another object of the present invention is to provide a stable solid state switching circuit for AC signals.

A further object of the present invention is the provision of a solid state circuit employing transistors in which AC signals are switched in response to a DC control signal or voltage.

Still a further object of the present invention is to provide a simple relatively inexpensive transistorized switching circuit in which AC signals are switched in response to a DC control voltage of a selectable amplitude.

These and other objects of the present invention are achieved by providing a circuit in which the switching of AC signals, supplied to an input terminal, is controlled as a function of the state of conduction of a conducting device, such as a transistor. When the transistor is in a nonconducting state, the input AC signals, at the input terminal, are inhibited from being impressed or supplied to the output terminal. However, when the transistor is in a conducting state, the input AC signals are impressed at the output terminal. The state of conduction of the transistor is controlled by a pair of transistors, the state of conduction of which is in turn controlled by the controlling DC control voltage. In the absence of a DC control voltage of the desired amplitude, both transistors are substantially the same state of conduction, so that the transistor connected between the input and output terminals is in a nonconducting state. However, when a DC control signal of the desired amplitude is supplied to the pair of transistors, one of the transistors is in a state of conduction different from that of the other transistor, resulting in a potential difference, which is impressed between the base and emitter of the transistor connected between the input and output terminals. Consequently, the latter transistor is switched to its conducting state, resulting in the input AC signals being impressed at the output terminal of the circuit. Thus, the switching of the AC signals between the input and output terminals is controlled by the DC control signal.

The novel features that are considered characteristic of this invention are set forth with particularity in the appended claims. The invention itself both as to its organization and method of operation, as well as additional objects and advantages thereof, will best be understood from the following description when read in connection with the accompanying drawing, which is a schematic diagram of the switching circuit of the present invention.

Referring to the figure, there is shown a first semiconductor device such as a PNP transistor 11 having its emitter 11*e* connected to an input terminal 12 and its collector 11*c* connected to an output terminal 13 and through a resistor R1 to a source of negative potential such as —20 volts. The emitter and collector may also be connected to the input and output terminals respectively through coupling capacitors C1 and C2 (or transformers). In addition, a variable resistor R2 may be placed between the emitter 11*e* and the input terminal 12 in order to control the gain produced by transistor 11. The transistor also includes a base 11*b*, which together with the emitter 11*e*, are connected to a semiconductor control circuit, generally designated by numeral 15.

In accordance with the teachings of the present invention, AC signals supplied to input terminal 12 are alternately transferred to the output terminal 13 when transistor 11 is in a conductive state, which is in turn controlled by the potential difference between the base 11*b* and emitter 11*e*, produced by the control circuit 15. As seen from the figure, circuit 15 comprises a pair of NPN transistors 16 and 17, each having its respective base 16*b*, 17*b*, collector 16*c*, 17*c*, and emitter 16*e*, 17*e*. Collectors 16*c* and 17*c* are connected to a source of positive potential such as +20 volts, through resistors R3 and R4, respectively. Also, collector 16*c* is connected to the emitter 11*e* of transistor 11. The emitters 16*e* and 17*e* are connected to opposite ends of a resistor R5. In the preferred embodiment of the invention, resistor R5 comprises a variable resistor, the movable arm of which is connected to a constant current source 20. The function of the latter circuit is to provide constant emitter current to the emitters of transistors 16 and 17, in order to stabilize the operation of the switching circuit hereindescribed. In one embodiment of the invention, the constant current source 20 comprised an NPN transistor 21 having its collector 21*c* connected to the movable arm of resistor R5, with the emitter 21*e* being connected to the source of —20 volts through a resistor R6. The base 21*b* of transistor 21 was connected through a resistor R7 to a reference potential such as ground, with a Zener diode Z1 being connected between the base 21*b* and the —20 volt source. The base 16*b* of transistor 16 was connected through serially connected resistors R8 and R9, forming a voltage divider, to the ground potential, while the base 17*b* of transistor 17 was connected to the junction point between the two resistors, comprising the voltage divider. The DC control voltage is supplied to an input terminal 25 which is directly connected to the base 16*b* of transistor 16.

From the foregoing description, and from the figure, it should be appreciated by those familiar with the art that in the absence of a DC control voltage of an amplitude sufficient to produce large enough a potential difference between the base 11*b* and emitter 11*e* of transistor 11 to switch the transistor to its conductive state, the input AC signals at terminal 12 are inhibited from being impressed at output terminal 13. For example, with the moving arm in the middle of resistor R5, in the absence of a DC control voltage, transistors 16 and 17 will be in the same state or level of conduction. The collector voltage of each transistor will be approximately 12 volts DC with respect to ground potential. Thus the potential difference between the base and emitter of transistor 11 will be substantially zero, maintaining the transistor in the nonconducting state.

Furthermore, by unbalancing resistor R5, it is possible to maintain transistor 16 at a lower state of conduction than that of transistor 17 without a DC control voltage, in which case the base 11*b* is at a higher potential than the emitter 11*e*. However as long as the potential difference is not negative during a complete cycle of the input AC signals, the base 11*b* remains positive with respect to the emitter 11*e*, no output signal is provided at output terminal 13. For example, resistor R5 may be unbalanced so that the potential at 16*c* and 11*b* is +10 v. DC and that at 17*c* and 11*e* is +14 v. DC. However as long as the peaks of the AC signals do not exceed 4 volts, no AC signal is provided at output termihal 13.

However, by providing a DC control voltage of a sufficient amplitude at control terminal 25, due to the voltage dividing action of resistors R8 and R9, the voltage at base 17*b* is less than that at base 16*b*. Consequently, transistor 16 is at a higher state of conduction than that of transistor 17 so that collector 16*c* and base 11*b* connected thereto are at a lower voltage than interconnected collector 17*c* and base 11*e*, resulting in transistor 11 being switched to a conducting state over the complete cycle of each input AC signal. Thus output AC signals are impressed at output terminal 13. It should again be pointed out that by adjusting R5, the amplitude of the DC control voltage necessary to provide the AC switching is controllable.

In one actual reduction to practice of the novel switching circuit of the present invention, the following list of component values and types were used. It should be appreciated that the list is presented for explanatory purposes only rather than as a limitation on the teachings disclosed herein.

| Component: | Type or value |
|---|---|
| 11 | 2N328. |
| 16 and 17 | 2N2480. |
| 21 | 2N1613. |
| R1 | 47K. |
| R2 | 100K variable. |
| R3 | 100K ½w. |
| R4 | 100K ½w. |
| R5 | 1K variable. |
| R6 | 33K ½w. |
| R7 | 33K ½w. |
| R8 | 1K ½w. |
| R9 | 1K ½w. |
| Z1 | Zener 6.2 v. |
| C1 | 1 mfd. |
| C2 | 1 mfd. |

In the aforementioned embodiment actually reduced to practice, the resistor R2 was adjusted so that the gain of transistor 11 was unity. The output of transistor 11 was found to be flat within +3 db in the frequency range between 6 cycles per second to 21.5 kc. By adjusting the variable resistor R5, the amplitude of the direct current signal at terminal 25 necessary to produce the AC switching was made a variable between the limits of 0.1 v. DC and 5 v. DC.

There has accordingly been shown and described herein a novel circuit for switching AC signals between input and output terminals as a function of the amplitude of a direct current control signal. The circuit of the invention incorporates solid state semiconductor components which include a first semiconductor transistor used to provide a path for the AC signals between input and output terminals when it is switched to its conducting state, while inhibiting the flow of signals therebetween when being in the nonconductive state. The state of conduction of the particular transistor is controlled by a pair of transistors, which in the absence of a DC control signal of sufficient amplitude, maintains the transistor in a nonconductive state. However, when the amplitude of the DC control signal reaches a selected amplitude, the two controlling transistors are switched to different states of conduction, because of the voltage divider R8, R9, providing a potential difference between the base and emitter of the transistor connected between the input and output terminals. Consequently, the latter transistor is switched to the conductive state and thereby provides a path for the AC signals from the input terminal to be supplied to the output terminals.

It is appreciated that those familiar with the art may make modifications and/or substitute equivalents in the specific arrangements hereinbefore described for explanatory purposes, without departing from the true spirit of the invention. Therefore, all such modifications and/or equivalents are deemed to fall within the scope of the invention as defined in the appended claims.

What is claimed is:

1. A signal switching circuit comprising:
an input terminal for receiving alternating current input signals;
an output terminal;
a first transistor having conductive and nonconductive states, coupled between said input and output terminals, for switching said input signals from said input terminal to said output terminal when said first transistor is in said conductive state, said transistor having a base electrode, an emitter electrode coupled to said input terminal, and a collector electrode coupled to said output electrode; and
semiconductor control means including second and third transistors respectively coupled to the base electrode and to the emitter electrode of said first transistor for selectively controlling the potential difference between the base and emitter electrodes of said first transistor in the absence of input signals to be a function of the relative conductive states of said second and third transistors, said potential difference including a selected potential difference of a first polarity whereby said first transistor is in a nonconductive state so that an output signal is present at said output terminal only when the input signal at said input terminal has an amplitude above said selected potential difference and of a second polarity opposite said first polarity, said semiconductor control means further including means responsive to a direct-current control signal for controlling the relative conduction states of said second and third transistors as a function of at least the amplitude of said direct-current control signal.

2. A switching circuit comprising:
an input terminal for receiving alternating current signals;
an output terminal;
a first source of reference potential;
a first transistor having emitter, collector and base electrodes, said transistor being switchable between conductive and nonconductive states;
means coupling the emitter and collector of said first transistor to said input and output terminals respectively;
first resistive means coupled between said collector and said first source of reference potential;
a control terminal for receiving a direct current control signal; and
control means coupled to said control terminal and the emitter and base electrodes of said first transistor for controlling the direct-current potential difference between said emitter and base electrodes said control means including means for selectively controlling the potential difference in the absence of said direct current control signal at said control terminal, to be of a first polarity, whereby said first transistor is in a nonconductive state, with said current signals which have an amplitude below said first potential difference being inhibited from being switched to said output terminal.

3. The circuit defined in claim 2 wherein said control means include second and third transistors respectively coupled to the base and emitter electrodes of said first transistor, and circuit means coupled to said first and second transistors and to said control terminal for controlling said second and third transistors to be in selected states of conduction so as to provide a selected direct-current potential difference between the base and emitter electrodes of said first transistor when the amplitude of said control signal is above a selected level.

4. The circuit defined in claim 3 wherein each of said second and third transistors includes a base electrode, an emitter electrode and a collector electrode, said control means including means for coupling the collector electrode of said second transistor to the base electrode of said first transistor, means for coupling the collector electrode of said third transistor to the emitter electrode of said first transistor, manually adjustable control means for providing the emitter electrodes of said second and third transistors with controllable emitter currents, and means connected to said control terminal for controlling the relative potentials at the collector electrodes of said second and third transistors as a function of the potentials at the emitter electrodes of said second and third transistors and the amplitudes of said control signal.

References Cited

UNITED STATES PATENTS

| | | | |
|---|---|---|---|
| 2,979,625 | 4/1961 | Bothwell et al. | 307—239 |
| 3,054,910 | 9/1962 | Bothwell | 307—235 |
| 3,173,023 | 3/1965 | Talsoe. | |
| 3,365,586 | 1/1968 | Billings | 307—235 |

JOHN S. HEYMAN, Primary Examiner

B. P. DAVIS, Assistant Examiner

U.S. Cl. X.R.

307—235, 237; 330—30